US008292567B2

(12) United States Patent
Damle et al.

(10) Patent No.: US 8,292,567 B2
(45) Date of Patent: Oct. 23, 2012

(54) STATOR ASSEMBLY INCLUDING BLEED PORTS FOR TURBINE ENGINE COMPRESSOR (75) Inventors: Sachin V. Damle, San Diego, CA (US); Bachar Adjan, San Diego, CA (US); Jerry Mar Philip Fregoe, San Diego, CA (US)

(73) Assignee: Caterpillar Inc., Peoria, IL (US)

(*) Notice: Subject to any disclaimer, the term of this patent is extended or adjusted under 35 U.S.C. 154(b) by 1293 days.

(21) Appl. No.: 11/898,604

(22) Filed: Sep. 13, 2007

(65) Prior Publication Data
US 2009/0000306 A1    Jan. 1, 2009

Related U.S. Application Data (60) Provisional application No. 60/844,397, filed on Sep. 14, 2006.

(51) Int. Cl.
F04D 27/02    (2006.01)
(52) U.S. Cl. ............................................ 415/1; 415/144
(58) Field of Classification Search .............. 415/1, 144, 415/145; 60/248, 785
See application file for complete search history.

(56) References Cited

U.S. PATENT DOCUMENTS

| | | | |
|---|---|---|---|
| 2,291,828 A * | 8/1942 | New .............................. 415/115 |
| 2,848,156 A * | 8/1958 | Oppenheimer ............... 415/108 |
| 3,142,438 A | 7/1964 | McKenzie |
| 3,632,223 A | 1/1972 | Hampton |
| 3,846,038 A * | 11/1974 | Carriere et al. ................... 415/1 |
| 4,086,022 A * | 4/1978 | Freeman et al. .............. 415/119 |
| 5,059,093 A | 10/1991 | Khalid et al. |
| 5,203,162 A | 4/1993 | Burge |
| 5,209,633 A | 5/1993 | McGreehan et al. |
| 5,509,093 A | 4/1996 | Miller et al. |
| 5,531,565 A | 7/1996 | Meindl et al. |
| 5,743,713 A * | 4/1998 | Hattori et al. ................. 416/215 |
| 6,109,868 A | 8/2000 | Bulman et al. |

(Continued)

FOREIGN PATENT DOCUMENTS
EP    1 561 911 A1    8/2005

OTHER PUBLICATIONS

Office Action from China Patent Office in counterpart application No. 200780038350.5 mailed Feb. 2, 24, 2011 (8 pages) and English language translation thereof (7 pages).

Primary Examiner — Edward Look
Assistant Examiner — Adam Benson
(74) Attorney, Agent, or Firm — Finnegan, Henderson, Farabow, Garrett & Dunner LLP (57) ABSTRACT A stator assembly for a turbine engine is disclosed. The stator assembly has a stator support ring, a plurality of stator vanes protruding radially inwardly from the stator support ring, and at least one bleed port disposed on the stator support ring between at least two adjacent stator vanes of the plurality of stator vanes. The at least one bleed port defines an oblong profile having a first end terminating near a leading edge of a first stator vane of the at least two adjacent stator vanes, and a second end, substantially opposed from the first end, terminating near a trailing edge of a second stator vane of the at least two adjacent stator vanes. The profile may be concave toward a suction sidewall of the second stator vane of the at least two adjacent stator vanes.

25 Claims, 6 Drawing Sheets

U.S. PATENT DOCUMENTS

| | | | |
|---|---|---|---|
| 6,371,727 B1 * | 4/2002 | Stangeland et al. | 416/190 |
| 6,438,941 B1 | 8/2002 | Elliott et al. | |
| 6,550,254 B2 * | 4/2003 | Proctor et al. | 60/785 |
| 6,663,346 B2 * | 12/2003 | Munsell et al. | 416/97 R |
| 6,986,638 B2 * | 1/2006 | Austin et al. | 415/115 |
| 2002/0134891 A1 * | 9/2002 | Guillot et al. | 244/199 |
| 2003/0033815 A1 | 2/2003 | Proctor et al. | |
| 2003/0133796 A1 | 7/2003 | Munsell et al. | |
| 2005/0210882 A1 | 9/2005 | Winstanley | |
| 2006/0051199 A1 * | 3/2006 | Guemmer | 415/144 |
| 2006/0153673 A1 * | 7/2006 | Guemmer | 415/115 |
| 2006/0277919 A1 | 12/2006 | Martensson et al. | |

* cited by examiner

STATOR ASSEMBLY INCLUDING BLEED PORTS FOR TURBINE ENGINE COMPRESSOR

CROSS REFERENCE

This application is based upon and claims the benefit of priority from U.S. Provisional Application No. 60/844,397 filed on Sep. 14, 2006, the entire contents of which are incorporated herein by reference.

TECHNICAL FIELD

The present disclosure relates generally to a turbine engine, and more particularly, to a stator assembly including bleed ports for a turbine engine compressor.

BACKGROUND

Gas turbine engines draw ambient air from the atmosphere, compress the ambient air, mix the compressed air with a gaseous and/or liquid fuel, and ignite the mixture. As the mixture combusts, heated gases expand and travel at high speed to rotationally drive a turbine section, creating a useful power output. Due to the violent nature of combustion, various engine components may need to be cooled and buffered during operation for durability and engine component longevity. As such, inter-stage bleed ports have been provided within the compressor, where the air is still relatively cool, to draw off a portion of the airflow. The drawn air may then be circulated throughout the engine to provide cooling, buffering, and/or to drive other systems associated with the engine.

Circular bleed ports have been provided for such purposes. Although the circular bleed ports may have provided adequate air-drawing characteristics, bleeding air through such a shape tends to disturb airflow within the compressor flowpath, and, as a result, may reduce engine efficiency and power output. Additionally, a circular shape may not be the most optimum shape for minimizing pressure loss across the ports, which is an important characteristic of the effectiveness of bleed extraction. Therefore, a need existed for bleed ports to provide improved air-drawing characteristics without unduly disturbing airflow through the compressor.

One attempt to improve bleed port air-drawing characteristics is provided by U.S. Patent Application Publication No. 2006/0051199 (the '199 publication) by Guemmer, published on Mar. 9, 2006. Specifically, the '199 publication discloses fluid removal openings of a variety of shapes for a turbo machine. The fluid removal openings of the '199 publication purportedly improved air drawing characteristics between two adjacent vanes. However, the fluid removal openings are positioned in close proximity to a suction side of a first vane, but distant from a pressure side of a second vane. Further, the fluid removal openings are generally convex toward the blade suction side. This arrangement may not suitably reduce disturbances in airflow to the extent necessary to provide a desired level of efficiency and power output. Specifically, the location, shape, and orientation of the fluid removal openings may cause undue aerodynamic losses due to airflow separation between the vanes; particularly, near the suction side of the vanes.

The bleed ports of the present disclosure solve one or more of the problems set forth above.

SUMMARY OF THE INVENTION

One aspect of the present disclosure is directed to a stator assembly for a turbine engine. The stator assembly may include a stator support ring and a plurality of stator vanes protruding radially inwardly from the stator support ring. The stator assembly may include at least one bleed port disposed on the stator support ring between at least two adjacent stator vanes of the plurality of stator vanes, wherein the at least one bleed port defines an oblong profile having a first end terminating near a leading edge of a first stator vane of the at least two adjacent stator vanes, and a second end, substantially opposed from the first end, terminating near a trailing edge of a second stator vane of the at least two adjacent stator vanes. The profile may be concave toward a suction sidewall of the second stator vane of the at least two adjacent stator vanes.

Another aspect of the present disclosure is directed to a compressor for a gas turbine engine. The compressor may include a casing, at least one rotor assembly encompassed by the casing, and at least one stator assembly disposed downstream from the rotor assembly and encompassed by the casing. The stator assembly may include a stator support ring, and a plurality of stator vanes protruding radially inwardly from the stator support ring. The assembly may also include at least one bleed port disposed on the stator support ring between at least two adjacent stator vanes of the plurality of stator vanes. The at least one bleed port may define an oblong profile. The profile may include a first end terminating near a leading edge of a first stator vane of the at least two adjacent stator vanes, and a second end, substantially opposed from the first end, terminating near a trailing edge of a second stator vane of the at least two adjacent stator vanes. The profile may be concave toward a suction sidewall of the second stator vane of the at least two adjacent stator vanes.

Yet another aspect of the present disclosure is directed to a segment of stator assembly. The segment may include a vane member protruding from a stator support ring member. A first side of the stator support ring member may define a first portion of a first bleed port, and a second side of the stator support ring member opposite the first side of the stator support ring member may define a second counterpart portion of a second bleed port adjacent to the first bleed port. The first portion of the first bleed port may define a first end terminating near a trailing edge of the vane member, and the second counterpart portion of the second bleed port may define a second end terminating near a leading edge of the vane member. The first portion of the first bleed port may be concave toward a suction sidewall of the vane member, and the second counterpart portion of the second bleed port may be convex toward a pressure sidewall of the vane member.

Still yet another aspect of the present disclosure is directed to a method of bleeding air in a turbine engine. The method may include bleeding compressed air through at least one port located between at least two adjacent stator vanes. The at least one port may define an oblong profile having a first end terminating near a leading edge of a first stator vane of the at least two adjacent stator vanes, and a second end, substantially opposed from the first end, terminating near a trailing edge of a second stator vane of the at least two adjacent stator vanes. The profile may be concave toward a suction sidewall of the second stator vane of the at least two adjacent stator vanes.

DETAILED DESCRIPTION

Figure 1:
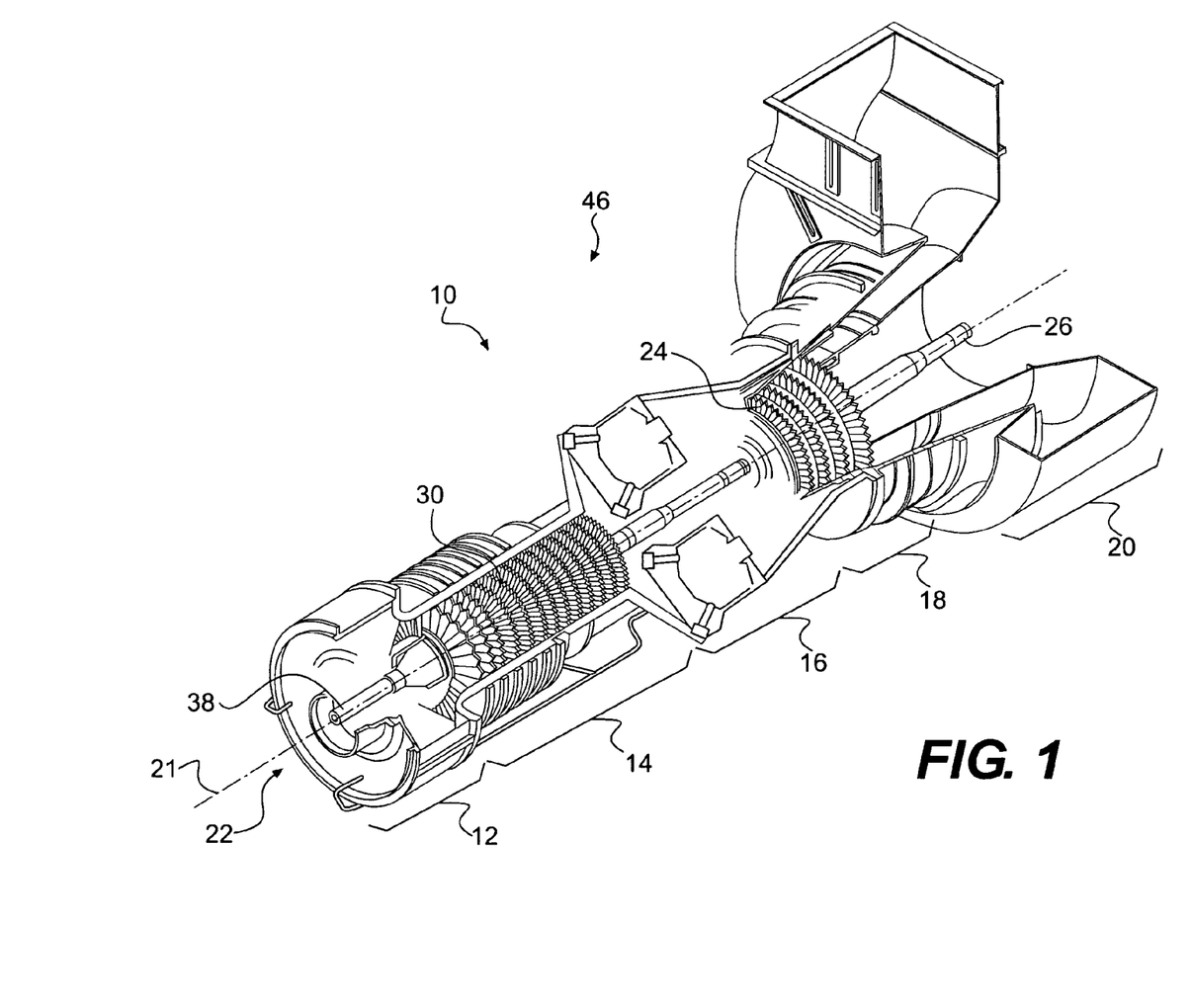
FIG. 1 is a cutaway-view representation of an exemplary disclosed turbine engine.

FIG. 1 illustrates an exemplary turbine engine 10. Turbine engine 10 may be associated with a stationary or mobile work machine configured to accomplish a predetermined task. For example, turbine engine 10 may embody the primary power source of a generator set that produces an electrical power output or of a pumping mechanism that performs a fluid pumping operation. Turbine engine 10 may alternatively embody the prime mover of an earth-moving machine, a passenger vehicle, a marine vessel, an aircraft, or any other mobile machine known in the art.

Turbine engine 10 may include an inlet duct 12, a compressor section 14, a combustor section 16, a turbine section 18, and an exhaust section 20 coaxially disposed along an engine centerline 21. Gas may flow through turbine engine 10 substantially along a direction of centerline 21 and within a flowpath 22. During operation, inlet duct 12 may direct ambient air into turbine engine 10 and provide the ambient air to compressor section 14. Compressor section 14 may include one or more stages and compress the ambient air to a desired pressure. The compressed air may then be directed downstream toward combustor section 16 for mixture with a liquid and/or gaseous fuel. Combustor section 16 may ignite the mixture to generate heated, high-energy gas that expands and moves with high velocity into turbine section 18. Turbine section 18 may include one or more stages of nozzles (not shown) and turbine blades 24. Turbine blades 24 may be fixedly connected to an output shaft 26. As turbine blades 24 are bombarded with the high-energy gas flow, a torque may be applied by blades 24 to output shaft 26, and causes it to rotate and thereby convert the high energy gas flow to a useful mechanical (rotational) power. One portion of this power may be used to drive compressor section 14, while another portion thereof may be drawn from turbine engine 10 and used for a variety of purposes, such as, for example, powering external devices (not shown). Exhaust section 20 may treat spent exhaust (e.g., remove pollutants and/or attenuate noise) from combustor and turbine sections 14, 16, and direct it to the atmosphere.

Figure 2:
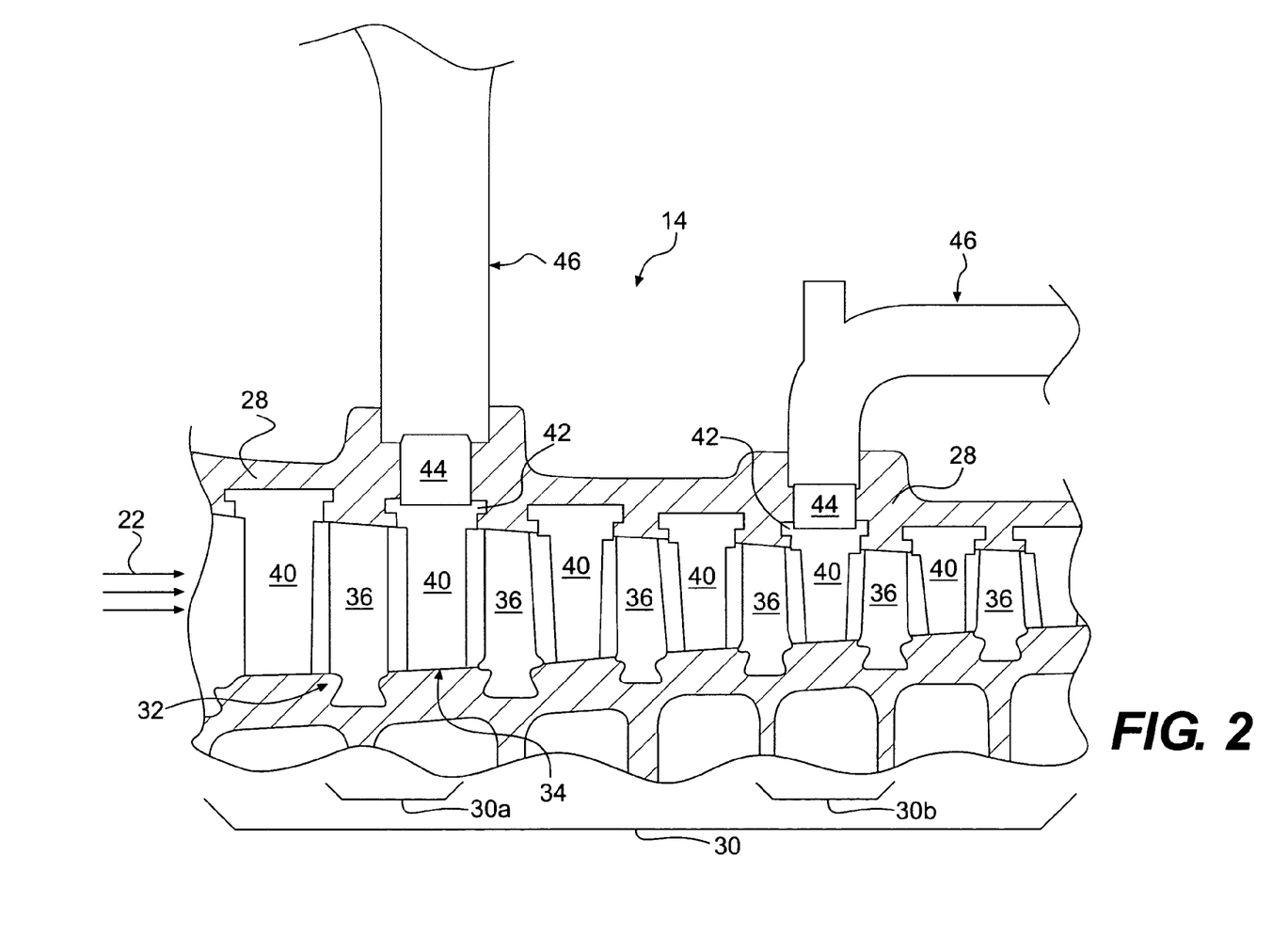
FIG. 2 is a cross-sectional representation of an exemplary disclosed compressor for the turbine engine of FIG. 1.

FIG. 2 shows a cross-sectional schematic illustration of compressor section 14. Compressor section 14 may be disposed downstream from duct 12 and include an outer casing 28 extending around one or more coaxially arranged compressor stages 30, which may successively compress the ambient air provided by duct 12. In one aspect, each of stages 30 may have a respective compression ratio defining an amount by which the ambient air may be compressed by the stage during operation of engine 10. Each of stages 30 may include a rotor assembly 32 and a stator assembly 34. Rotor assembly 32 may include a plurality of rotor blades 36 protruding radially outwardly from a central shaft 38 into flowpath 22. Similarly, stator assembly 34 may include a plurality of stator vanes 40 extending radially inwardly from a stationary stator support ring 42 into flowpath 22. Stator support ring 42 may be mounted or otherwise fastened within compressor casing 28. Compressor 14 may further include a bleed plenum 44 formed between casing 28 and stator support ring 42. Plenum 44 may be disposed radially outwardly from stator vanes 40 and in fluid communication with flowpath 22. A bleed pipe routing system 46 may also be provided in fluid communication with plenum 44 to direct bleed air to other components and/or systems (not shown) associated with engine 10.

Figure 3:
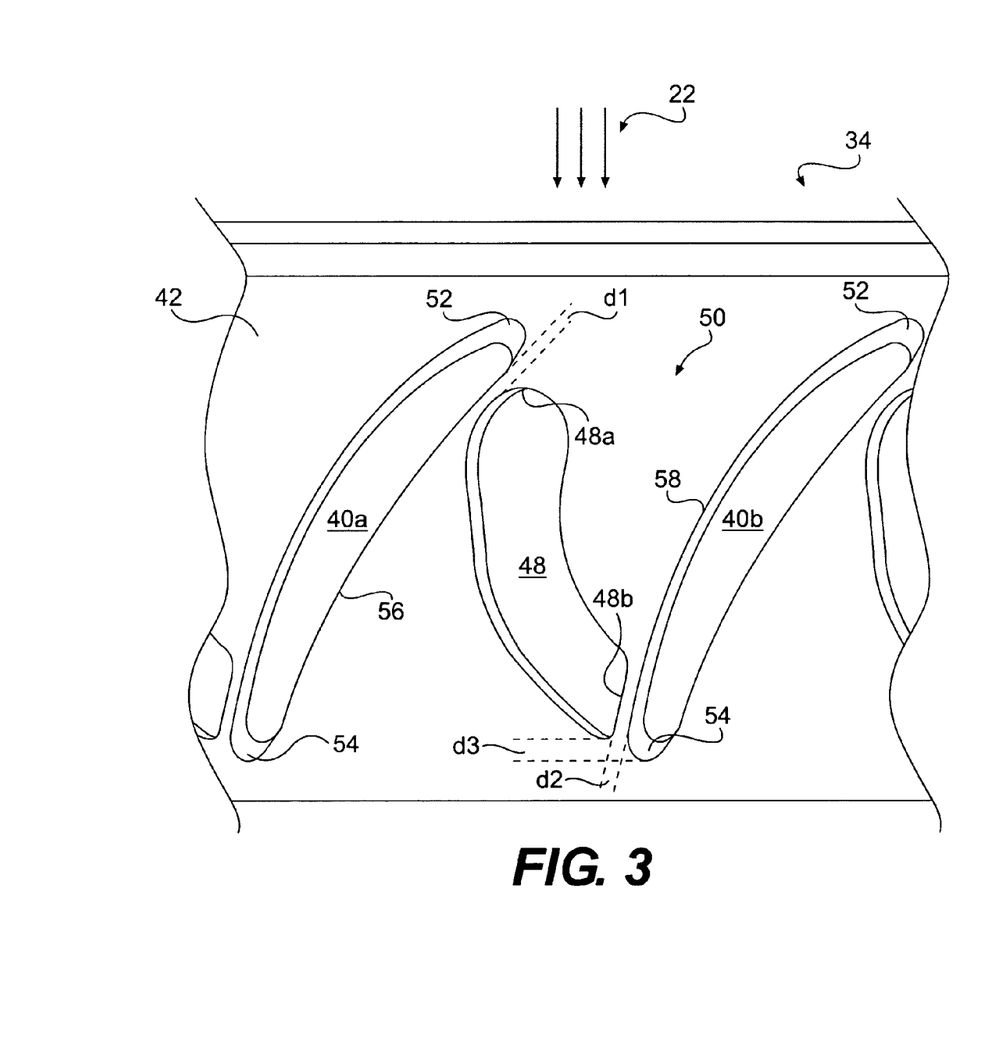
FIG. 3 is a cross-sectional plan view representation of an exemplary disclosed stator assembly for use with the compressor of FIG. 2.

As shown by FIG. 3, stator assembly 34 may include at least one bleed port 48 disposed on stator support ring 42. In one embodiment, bleed port 48 may be disposed at a position between two adjacent stator vanes 40a, 40b of the plurality of stator vanes 40. During engine operation, the location of bleed port 48 may correspond to uniform static high-pressure region 50. Each of stator vanes 40 is preferably an air foil having a leading edge 52 and a trailing edge 54. Bleed port 48 may define an oblong cross-sectional profile including a first end 48a terminating near leading edge 52 of a first 40a of the at least two adjacent stator vanes 40a, 40b, and a second end 48b, substantially opposed from first end 48a, terminating near the trailing edge 54 of a second 40b of the at least two adjacent stator vanes 40a, 40b. In one aspect, first end 48a may define a curve and second end 48b may be substantially linear. However, it is to be appreciated that first and second ends 48a, 48b may define other desired profiles as to provide a bleed port 48 having an aerodynamically efficient shape in its entirety. During operation, first end 48a may be upstream from second end 48b, and leading edge 52 may be upstream from trailing edge 54 with respect to a direction of flowpath 22 and/or engine centerline 21.

Additionally, first end 48a may terminate near a pressure sidewall 56 of the first 40a of the at least two adjacent stator vanes 40a, 40b, while second end 48b may terminate near a suction sidewall 58 of the second 40b of the at least two adjacent stator vanes 40a, 40b. As such, bleed port 48 may extend substantially across uniform static high pressure region 50 during operation. In one embodiment exhibiting a desired level of performance, first end 48a may terminate at a distance d1 of about 0.145 inches from pressure sidewall 56 of first stator vane 40a, while second end 48b may terminate at a distance d2 of about 0.078 inches from suction sidewall 58 of second stator vane 48b. Further, second end 48b may terminate a distance d3 of about 0.077 inches from trailing edge 54 of second 40b of the at least two adjacent stator vanes 40 with respect to a direction of flowpath 22 and/or engine centerline 21. This embodiment may be suitable for a low compressor stage, such as, for example, an eighth stage. In another embodiment providing a desired level of performance, distances d1, d2, and d3 may be about 0.081 inches, 0.080 inches, and about 0.067 inches, respectively. This embodiment may be suitable for a high compressor stage, such as, for example, an eleventh stage. It is to be appreciated, however, that the positioning of bleed port 48 with respect to adjacent stator vanes 40a, 40b may be adjusted as necessary to provide a desired level of performance under a given set of circumstances, based on design and/or manufacturing specifications. Furthermore, the bleed port profile may be convex toward pressure sidewall 56 of the first 40a of the at least two adjacent stator vanes 40a, 40b, and substantially concave toward suction sidewall 58 of the second 40b of the at least two adjacent stator vanes 40a, 40b. In one aspect, the profile may be considered to have the shape of a "peanut," and/or a "kidney," or the like.

In one exemplary embodiment, a shape of a perimeter of the profile of bleed port 48 may be substantially in accordance with Cartesian coordinates set forth in the following Tables I and/or II, carried to only three decimal places, and smoothly interconnected to form a complete bleed port shape. Each "X" and "Y" value may define a point along a perimeter of bleed port 48 in an X-Y plane with respect to the origin. "X" defines an axis extending in a direction parallel to engine centerline 21, while "Y" defines an axis extending in a tangential, or rotational direction. Bleed ports 48 as defined by Tables I and/or II may be used in any compressor stage(s) of any type of turbine engine, if desired. Further, these shapes can be scaled up or down depending on the desired amount of bleed air (e.g., a required bleed rate). It is to be appreciated that other like bleed port shapes of similar and/or different sizes are within the spirit and scope of this disclosure.

TABLE I

| X (in.) | Y (in.) |
|---|---|
| 0.459 | −0.139 |
| 0.476 | −0.134 |
| 0.495 | −0.128 |
| 0.501 | −0.125 |
| 0.506 | −0.120 |
| 0.511 | −0.112 |
| 0.513 | −0.100 |
| 0.511 | −0.091 |
| 0.503 | −0.079 |
| 0.489 | −0.063 |
| 0.474 | −0.048 |
| 0.453 | −0.027 |
| 0.426 | 0.000 |
| 0.380 | 0.039 |
| 0.314 | 0.088 |
| 0.246 | 0.132 |
| 0.142 | 0.171 |
| 0.015 | 0.188 |
| −0.090 | 0.184 |
| −0.186 | 0.155 |
| −0.255 | 0.120 |
| −0.376 | 0.085 |
| −0.343 | 0.044 |
| −0.357 | 0.012 |
| −0.355 | −0.031 |
| −0.330 | −0.066 |
| −0.291 | −0.081 |
| −0.246 | −0.081 |
| −0.195 | −0.071 |
| −0.145 | −0.055 |
| −0.071 | −0.039 |
| 0.031 | −0.039 |
| 0.151 | −0.075 |
| 0.221 | −0.122 |
| 0.262 | −0.156 |
| 0.291 | −0.175 |
| 0.300 | −0.179 |
| 0.313 | −0.182 |
| 0.323 | −0.181 |
| 0.327 | −0.179 |
| 0.347 | −0.173 |
| 0.386 | −0.162 |
| 0.425 | −0.149 |
| 0.459 | −0.139 |

TABLE II

| X (in.) | Y (in.) |
|---|---|
| 0.398 | −0.115 |
| 0.414 | −0.111 |
| 0.427 | −0.107 |
| 0.438 | −0.096 |
| 0.440 | −0.082 |
| 0.434 | −0.068 |
| 0.418 | −0.054 |
| 0.405 | −0.042 |
| 0.382 | −0.022 |
| 0.351 | 0.002 |
| 0.309 | 0.033 |
| 0.265 | 0.060 |
| 0.203 | 0.083 |
| 0.143 | 0.093 |
| 0.072 | 0.091 |
| 0.0203 | 0.079 |
| −0.031 | 0.059 |
| −0.075 | 0.038 |
| −0.116 | 0.014 |
| −0.155 | −0.012 |
| −0.178 | −0.036 |
| −0.183 | −0.059 |
| −0.172 | −0.088 |
| −0.150 | −0.101 |
| −0.116 | −0.100 |
| −0.083 | −0.092 |
| −0.042 | −0.081 |
| 0.003 | −0.070 |
| 0.059 | −0.060 |
| 0.122 | −0.063 |
| 0.167 | −0.076 |
| 0.204 | −0.094 |
| 0.232 | −0.114 |
| 0.249 | −0.129 |
| 0.256 | −0.135 |
| 0.263 | −0.142 |
| 0.273 | −0.146 |
| 0.289 | −0.144 |
| 0.305 | −0.139 |
| 0.323 | −0.134 |
| 0.343 | −0.130 |
| 0.362 | −0.124 |
| 0.381 | −0.120 |
| 0.398 | −0.115 |

It is to be appreciated that stator assembly 34, at least one bleed port 48, and/or bleed plenum 44 may be included in one or more of compressor stages 30, if desired. However, in one embodiment, stator assembly 34, at least one bleed port 48, and/or bleed plenum 44 may be included in an eighth stage 30a and an eleventh stage 30b (FIG. 2) of compressor 14 to provide a desired level of performance.

Figure 4A:
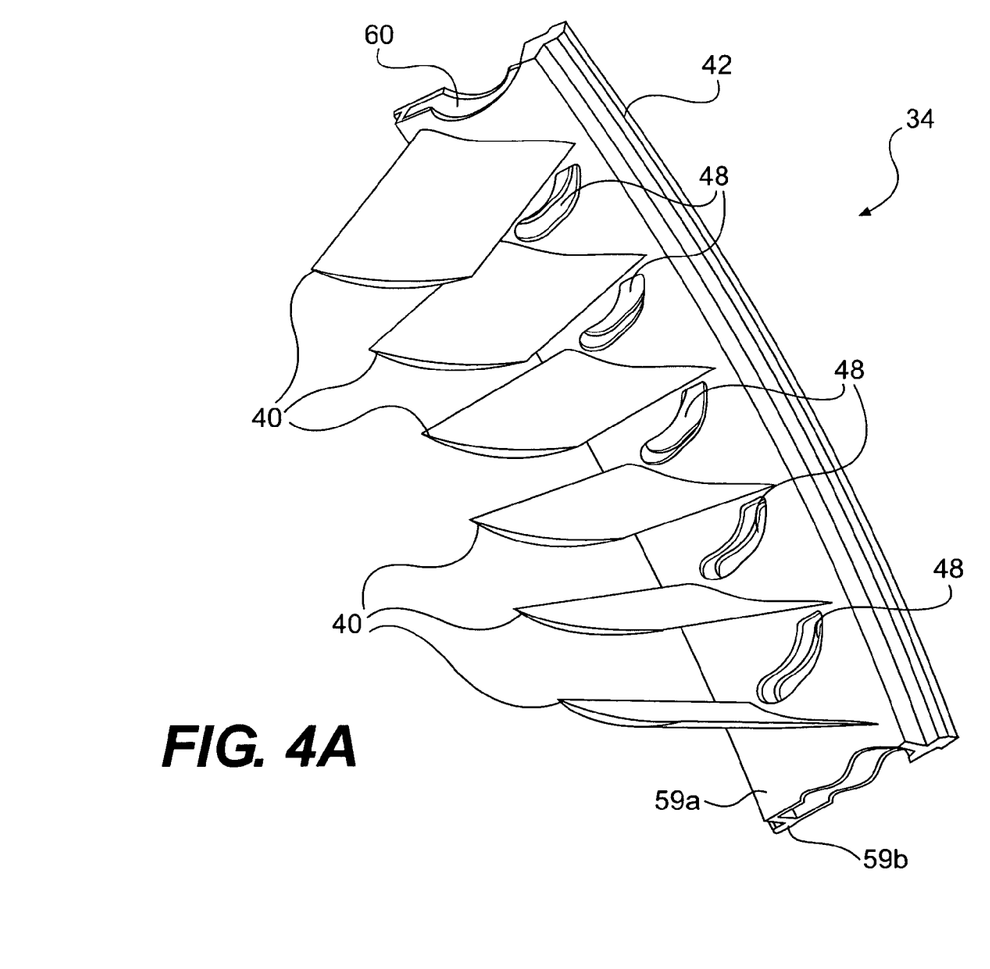
FIG. 4A is a pictorial representation of the exemplary disclosed stator assembly of FIG. 3.
Figure 4B:
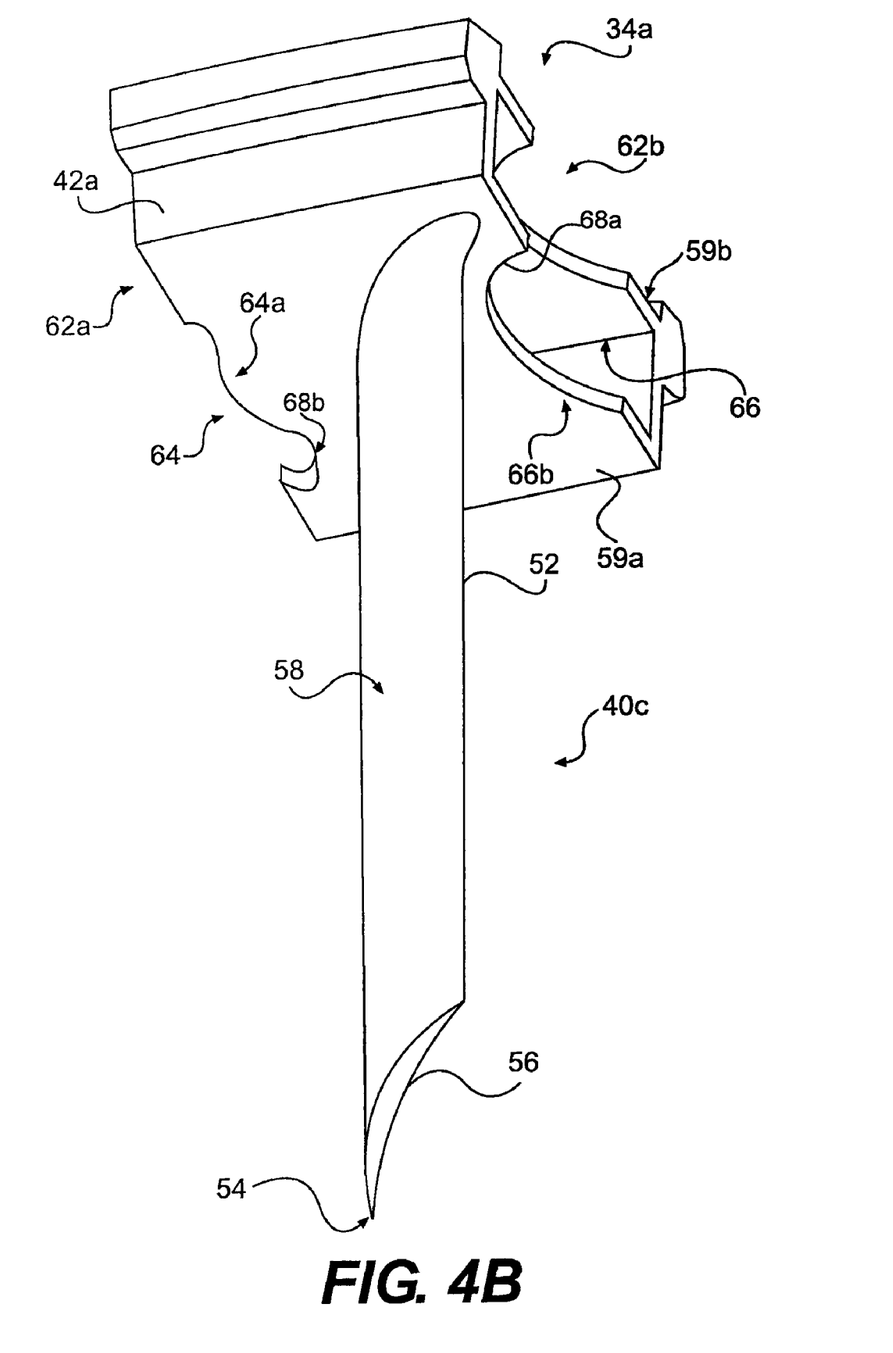
FIGS. 4B and 4C are pictorial representations of exemplary disclosed segments making up the stator assembly of FIG. 4A.
Figure 4C:
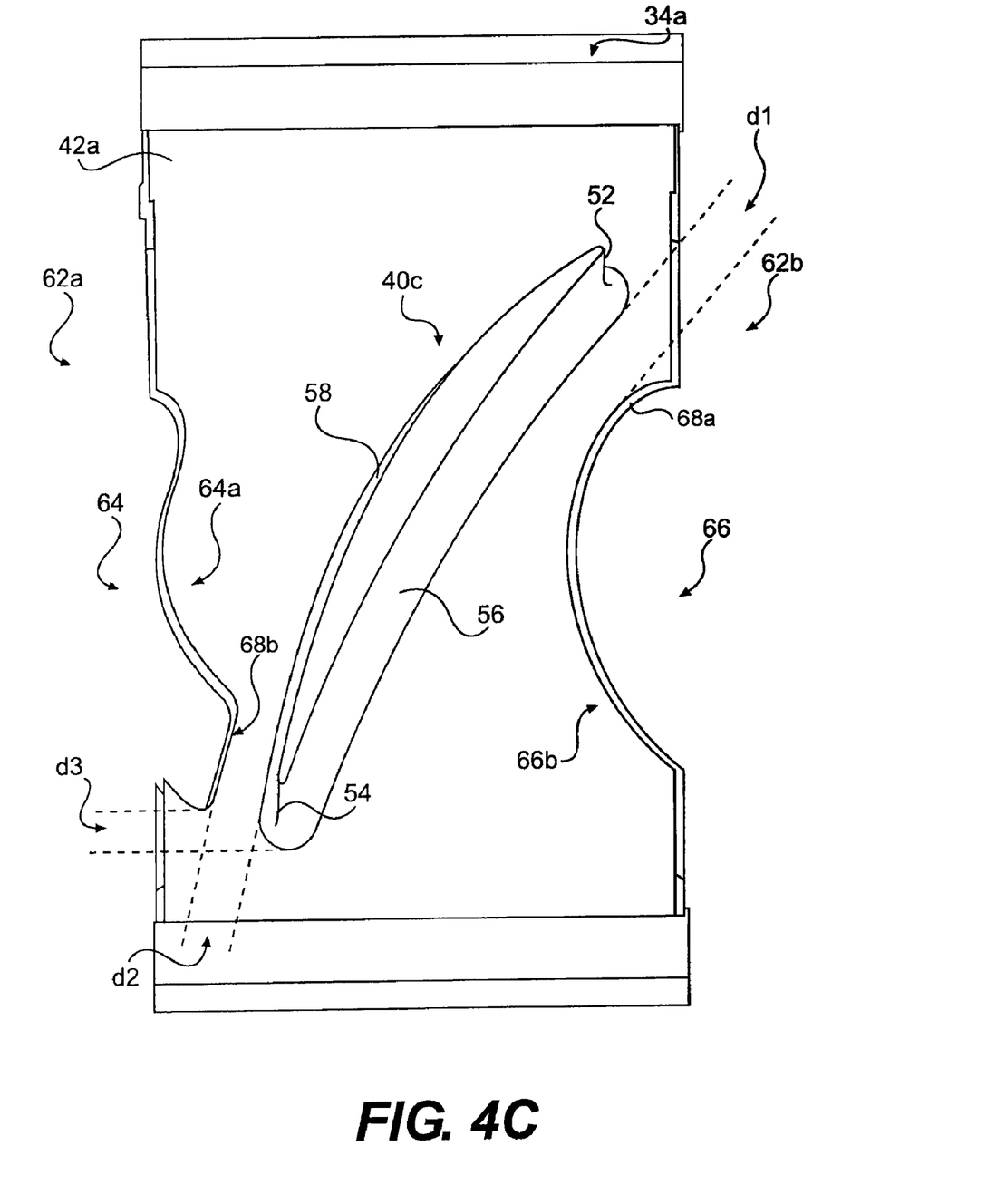

FIGS. 4A-4C show pictorial representations of an exemplary stator assembly 34. Referring to FIG. 4A, stator assembly 34 may comprise a curved stator support ring 42, having a plurality of bleed ports 48, from which a plurality of stator vanes 40 protrude radially inwardly. In one embodiment, stator vanes 40 may be substantially perpendicular to stator support ring 42. Inner 59a and outer 59b edges or bands of stator support ring 42 may define a cavity 60 to fluidly couple bleed ports 48 to bleed plenum 44.

Referring to FIGS. 4B and 4C, stator assembly 34 may comprise a plurality of segments 34a arranged to form a complete stator assembly 34. Each segment 34a may comprise a stator vane member 40c protruding from a stator support ring member 42a. Vane member 40c may be an individual air foil blade arranged perpendicularly to stator support ring member 42a. In one embodiment, vane member 40c and stator support ring member 42a may be integrally formed. Alternatively, vane member 40c may be fixedly attached or otherwise fastened to inner 59a and/or outer 59b bands of stator support ring member 42a. Segments 34a may be made of a metal, a ceramic, or any other suitable stator material known in the art.

Further, a first side 62a of stator support ring member 42a may define a first portion 64a of a first bleed port 64. A second side 62b of stator support ring member 42a opposite first side 62a may define a second counterpart portion 66b of a second bleed port 66 adjacent to first bleed port 64. As such, first portion 64a may oppose suction sidewall 58 of vane member 40c, while second counterpart portion 66b may oppose pressure sidewall 56 of vane member 40c.

Each of the first and second bleed ports, 64, 66, may define the oblong profile discussed above. Particularly, first portion 64a of first bleed port 64 may define a second end 68b terminating near a trailing edge 54 of vane member 40c, and second counterpart portion 66b of second bleed port 66 may define a first end 68a terminating near a leading edge 52 of vane member 40c. As discussed above, second end 68b may be substantially linear, while first end 68a may define a curve. It is to be appreciated, however, that the entire perimeter, including first and second ends 68a, 68b, may define another aerodynamically efficient shape, if desired. Further, first portion 64a of first bleed port 64 may be concave toward a suction sidewall 58 of vane member 40c, and second portion 66b of second bleed port 66 may be convex toward a pressure sidewall 56 of vane member 40c. Second end 68b of first bleed port 64 may terminate proximate suction sidewall 58 of vane member 40c, and first end 68a of second bleed port 66 may terminate proximate pressure sidewall 56 of vane member 40c. It is to be appreciated that the shape and/or arrangement of bleed ports 64, 66 may be in accordance with the coordinates provided in Table I and/or II, and/or the distances d1, d2, and/or d3 mentioned above as to provide a desired level of performance. Alternatively, the shape and/or arrangement of bleed port 64, 66 may be adjusted as necessary given certain design and/or manufacturing specifications.

In this manner, two of segments 34a may be mated such that first side 62a of a first segment abuts a second side 62b of a second segment adjacent the first segment to form a complete bleed port 48 therebetween having the profile discussed above. As such, a plurality of segments 34a may be annularly arranged to form a complete stator assembly 34 including a stator support ring 42 having a bleed port 48 disposed in between each two adjacent stator vanes of a plurality of stator vanes 40 protruding radially inwardly from stator support ring 42.

INDUSTRIAL APPLICABILITY

The disclosed stator assembly and bleed ports may be applicable to any turbine engine known in the art. Particularly, the disclosed stator assembly and bleed ports may be advantageous in situations where increased engine efficiency and power output may be attained by reducing disturbance of airflow through the compressor flowpath and improving the effectiveness of bleed air extraction through the bleed port. The operation of turbine engine 10 and stator assembly 34 will now be described.

Referring to FIG. 1, during engine operation, ambient air from the atmosphere may be directed into inlet duct 12. The ambient air may flow downstream along flowpath 22, and into compressor section 14. Within compressor section 14, a series of compressor stages 30, each containing a rotor assembly 32 having a plurality of rotor blades 36 rotating about central shaft 38, may successively compress the ambient air to achieve a desired pressure. Each stator assembly 34, positioned immediately downstream from a respective rotor assembly 32, may facilitate compression by reducing air velocity, increasing static pressure, and reducing airflow tangential swirl angle generated by rotor assembly 32.

Referring now to FIGS. 2, 3, and 4A, after compression, a majority of the compressed air (e.g., on the order of 90%-96%) may continue along flowpath 22 to the remaining sections of turbine engine 10, as discussed above. In one embodiment, a minority of the compressed air (e.g., on the order of 2%-10%) may be drawn out of compressor 14 by way of bleed ports 48 in an eighth compressor stage 30a and an eleventh compressor stage 30b. However, it is to be appreciated that the compressed air may be drawn from any stage(s), if desired. Static pressure increases as the air flows through stator assembly 34. Bleed ports 48 situated on stator support ring 42 within passages between stator vanes 40 may draw the minority portion of the compressed air into bleed plenum 44. The drawn air may then be routed to other components and systems of engine 10 by way of bleed pipe routing system 46 for cooling and/or buffering purposes.

The shape and orientation of the disclosed bleed ports 48 may follow the natural shape of the region where static pressure contours may be as close to uniform as possible. Thus, the compressed air within flowpath 22 in the vicinity of bleed port 48 may experience substantially reduced velocity gradients. Such uniformity of velocity and static pressure gradients may reduce the effects of flow extraction (i.e., bleeding air). In other words, the disclosed bleed ports 48 may cause the velocity and static pressure gradients present within flowpath 22 to be similar to velocity and static pressure gradients that would be present in a clean design with no bleed requirements (i.e., no disturbance from bleed ports at all). Therefore, the expected performance penalty due to bleed disturbances may be reduced.

Additionally, reducing these velocity gradients may allow stator vanes 40 and/or assemblies 34 in the vicinity of the drawn bleed air to aerodynamically operate as if they were cleanly designed (i.e., as if the bleed ports were not present). Otherwise, such velocity gradients may cause localized but dominant airflow separation from airfoil suction sidewall 58, which is a strong source of aerodynamic through-flow pressure loss. It is to be appreciated that through-flow pressure loss may reduce compressor aerodynamic efficiency, and, ultimately, reduce power output and thermal efficiency of turbine engine 10.

The bleed ports 48 of the present disclosure may also advantageously reduce a pressure drop experienced by the minority portion of the compressed air as it passes through bleed port 48 and into cavity 60 and bleed plenum 44. The pressure drop may include combined pressure drop across the inner band 59a, cavity 60, and outer band 59b of stator support ring 42. The reduction in pressure drop may directly or indirectly manifest itself in a system performance advantage. In addition, bleed ports 48 may exhibit a significant bleed rate despite the reduced pressure drop. Further, it is worth noting that the disclosed bleed ports 48 may draw the same amount of bleed air as the bleed ports of the prior art (e.g., circular) with a smaller flow area. For these reasons, a specified amount of compressed air may be bled without unduly sacrificing engine performance.

The shape and orientation of the disclosed bleed ports 44 may also facilitate higher compressor adiabatic and polytropic efficiency. In other words, a relatively low amount of work input may be required to compress the ambient air to a desired pressure. Accordingly, the minority portion of the compressed air may be drawn from compressor 14 at a relatively low temperature. Bleed air of a low temperature, when circulated to systems and or components associated with engine 10, can advantageously enhance cooling and buffering properties, and thereby improve engine performance and component longevity.

It will be apparent to those skilled in the art that various modifications and variations can be made to the stator assembly and/or bleed ports of the present disclosure without departing from the spirit and scope of the disclosure. The stator assembly and/or bleed ports disclosed herein may be included in any desired compressor stage(s) of any type of turbine engine, and provide advantageous compressor airflow characteristics and/or improved engine performance. Other embodiments will be apparent to those skilled in the art from consideration of the specification and practice of the stator assembly disclosed herein. It is intended that the specification and examples be considered as exemplary only, with a true scope of the disclosure being indicated by the following claims and their equivalents.

What is claimed is:

1. A stator assembly for a turbine engine, the stator assembly comprising:
   a stator support ring;
   a plurality of stator vanes protruding radially inwardly from the stator support ring; and
   at least one bleed port disposed on the stator support ring between at least two adjacent stator vanes of the plurality of stator vanes, wherein:
      the at least one bleed port defines an oblong profile, the profile having a first end and a second end, the second end being substantially opposed from the first end along a length of the profile that extends from a leading edge of a first stator vane of the at least two adjacent stator vanes to a trailing edge of a second stator vane of the at least two adjacent stator vanes,
      the first end is closer to the first stator vane than to the second stator vane, and the second end is closer to the second stator vane than to the first stator vane, and
      the profile is concave toward a suction sidewall of the second stator vane of the at least two adjacent stator vanes.

2. The stator assembly of claim 1, wherein the first end is proximate a pressure sidewall of the first stator vane of the at least two adjacent stator vanes, and the second end is proximate the suction sidewall of the second stator vane of the at least two adjacent stator vanes.

3. The stator assembly of claim 1, wherein the first end defines a predetermined curve.

4. The stator assembly of claim 1, wherein the second end is substantially linear.

5. The stator assembly of claim 1, wherein the first end is upstream from the second end with respect to a direction of airflow, and the profile extends from the leading edge of the first stator vane of the at least two adjacent stator vanes and the trailing edge of the second stator vane of the at least two adjacent stator vanes.

6. The stator assembly of claim 1, wherein the profile is convex toward a pressure sidewall of the first stator vane of the at least two adjacent stator vanes.

7. The stator assembly of claim 1, wherein a shape of the profile is substantially in accordance with Cartesian coordinates set forth in Table I or Table II, carried only to four decimal places, within a tolerance of one ten-thousandth, and smoothly interconnected to form a complete bleed port shape.

8. A compressor for a turbine engine, the compressor comprising:
   a casing;
   at least one rotor assembly encompassed by the casing; and
   at least one stator assembly disposed downstream from the rotor assembly and encompassed by the casing, the stator assembly comprising:
      a stator support ring;
      a plurality of stator vanes protruding radially inwardly from the stator support ring; and
      at least one bleed port disposed on the stator support ring between at least two adjacent stator vanes of the plurality of stator vanes, wherein:
         the at least one bleed port defines an oblong profile, the profile having a first end and a second end, the second end being substantially opposed from the first end along a length of the profile that extends from a first stator vane of the at least two adjacent stator vanes to a second stator vane of the at least two adjacent stator vanes, and
         the profile is concave toward a suction sidewall of the second stator vane of the at least two adjacent stator vanes.

9. The compressor of claim 8, wherein the first end is proximate a pressure sidewall of the first of the at least two adjacent stator vanes, and the second end is proximate the suction sidewall of the second of the at least two adjacent stator vanes.

10. The compressor of claim 8, wherein the first end defines a predetermined curve.

11. The compressor of claim 8, wherein the second end is substantially linear.

12. The compressor of claim 8, wherein the first end is upstream from the second end with respect to a direction of airflow.

13. The compressor of claim 8, wherein the profile is convex toward a pressure sidewall of the first of the at least two adjacent stator vanes.

14. The compressor of claim 8, wherein a shape of the profile is substantially in accordance with Cartesian coordinates set forth in Table I or Table II, carried only to four decimal places, and smoothly interconnected to form a complete bleed port shape.

15. The compressor of claim 8, further including a bleed plenum over the at least one bleed port between a radially inner surface of the casing and a radially outer surface of the stator support ring, wherein the bleed plenum is in fluid communication with the at least one bleed port.

16. A segment of stator assembly having a vane member protruding from a stator support ring member, wherein:
   a first side of the stator support ring member defines a first portion of a first bleed port;
   a second side of the stator support ring member opposite the first side of the stator support ring member defines a second counterpart portion of a second bleed port adjacent to the first bleed port;
   the first portion of the first bleed port defining a first profile having a second end and a first end, the first end being substantially opposed from the second end along a length of the first profile that extends from a trailing edge of the vane member to a leading edge of a first adjacent vane member of a first adjoining segment of the stator assembly, and the second end of the first profile being closer to the vane member than to the first adjacent vane member of the first adjoining segment of the stator assembly;
   the second counterpart portion of the second bleed port defining a second profile having a first end and a second end, the second end being substantially opposed from the first end along a length of the second profile that extends from a leading edge of the vane member to a trailing edge of a second adjacent vane member of a second adjoining segment of the stator assembly, and the first end of the second profile being closer to the vane member than to the second adjacent vane member of the second adjoining segment of the stator assembly;
   wherein the first portion of the first bleed port is concave toward a suction sidewall of the vane member, and the second counterpart portion of the second bleed port is convex toward a pressure sidewall of the vane member.

17. The segment of claim 16, wherein the second end of the first profile is proximate the suction sidewall of the vane member, and the first end of the second profile is proximate the pressure sidewall of the vane member.

18. The segment of claim 16, wherein the second end of the first profile is substantially linear, and the first end of the second profile defines a predetermined curve.

19. The segment of claim 16, wherein a shape of the first and second bleed port is substantially in accordance with Cartesian coordinates set forth in Table I or Table II, carried only to three decimal places, and smoothly interconnected to form a complete bleed port shape.

20. The segment of claim 16, wherein the vane member is substantially perpendicular to the stator support ring member.

21. The segment of claim 16, wherein the vane member and the stator support ring member are integrally formed.

22. The segment of claim 16, wherein the vane member is fixedly attached to the stator support ring member.

23. A method of bleeding air in a turbine engine, comprising:
bleeding compressed air through at least one port located between at least two of a plurality of adjacent stator vanes, wherein:
the at least one port defines an oblong profile, the profile having a first end and a second end, the second end being substantially opposed from the first end along a length of the profile that extends from a leading edge of a first stator vane of the at least two adjacent stator vanes to a trailing edge of a second stator vane of the at least two adjacent stator vanes,
the first end is closer to the first stator vane than to the second stator vane, and the second end is closer to the second stator vane than to the first stator vane, and
the profile is concave toward a suction sidewall of the second stator vane of the at least two adjacent stator vanes.

24. The method of claim 23, wherein a shape of the profile is substantially in accordance with Cartesian coordinates set forth in Table I or Table II, carried only to four decimal places, within a tolerance of one ten-thousandth, and smoothly interconnected to form a complete bleed port shape.

25. A stator assembly for a turbine engine, the stator assembly comprising:
a stator support ring;
a plurality of stator vanes protruding radially inwardly from the stator support ring; and
at least one bleed port disposed on the stator support ring between at least two adjacent stator vanes of the plurality of stator vanes, the at least one bleed port defining a profile that:
has a first end and a second end, the second end being substantially opposed from the first end along a length of the profile that extends from a leading edge of a first stator vane of the at least two adjacent stator vanes to a trailing edge of a second stator vane of the at least two adjacent stator vanes;
extends on both sides of a line parallel to a length of the first and second stator vanes and equidistant to the first and second stator vanes and;
is concave toward a suction sidewall of the second stator vane.

* * * * *